(12) United States Patent
Bonner et al.

(10) Patent No.: US 6,778,683 B1
(45) Date of Patent: Aug. 17, 2004

(54) METHOD AND APPARATUS FOR READING AND DECODING INFORMATION

(75) Inventors: Brett Bracewell Bonner, Cordova, TN (US); Ole-Petter Skaaksrud, Cordova, TN (US); Andris Jankevics, Westford, MA (US)

(73) Assignee: Federal Express Corporation, Memphis, TN (US)

(*) Notice: Subject to any disclaimer, the term of this patent is extended or adjusted under 35 U.S.C. 154(b) by 0 days.

(21) Appl. No.: 09/456,433

(22) Filed: Dec. 8, 1999

(51) Int. Cl.[7] ............................................. G06K 9/00
(52) U.S. Cl. .................. 382/101; 209/584; 209/900; 235/462.07; 235/470; 382/190; 382/317; 715/505; 715/523
(58) Field of Search ................................. 382/100, 101, 382/102, 181, 317; 235/462.01, 462.07, 470; 715/505, 507; 209/504, 584, 900

(56) References Cited

U.S. PATENT DOCUMENTS

| | | | | |
|---|---|---|---|---|
| 5,384,452 A | * | 1/1995 | He | 235/462.12 |
| 5,737,438 A | | 4/1998 | Zlotnick et al. | |
| 5,880,451 A | * | 3/1999 | Smith et al. | 235/462 |
| 6,123,361 A | * | 9/2000 | Cohen | 283/56 |
| 6,152,371 A | | 11/2000 | Schwartz et al. | |
| 6,370,259 B1 | * | 4/2002 | Hobson et al. | 382/101 |

FOREIGN PATENT DOCUMENTS

DE 32 06 267 2/1982

* cited by examiner

*Primary Examiner*—Bhavesh M. Mehta
*Assistant Examiner*—Gregory Desire
(74) *Attorney, Agent, or Firm*—Finnegan, Henderson, Farabow, Garrett & Dunner, LLP

(57) ABSTRACT

A method and apparatus is disclosed for reading and decoding information extracted from a form. In the system of the present invention, packages are randomly placed on a conveyor belt, with their labels facing a two-camera subassembly. As the conveyor belt moves, the two-camera subassembly continuously takes images of the belt underneath the overhead camera. The design of the camera permits it to take a high resolution image of a non-singulated, unjustified package flow. A digital image of the packages within the field of view of the camera is then transferred to the processing system for analysis. The processing system identifies individual packages in the image, extracts them and then analyzes the information written on the package labels. The analysis process utilizes conventional Optical Character Recognition (OCR) and Intelligent Character Recognition (ICR) techniques to evaluate the information written on the package label. Once the information is decoded, the system either accesses a database record associated with the decoded machine-readable code, or creates a new record. When an unknown word image is encountered, the field-specific recognition process is aided by use of lexicon information, optimized based on installation-specific or user-specific criteria. The lexicon information is continuously revised based on processed form information. In a preferred embodiment, verified destination addresses associated with a user are alphabetized or rank-ordered based on frequency of occurrence. It is only after the system determines that the originating user is not stored in the database does it resort to the ZIP+4 or similar database to verify a destination address.

32 Claims, 15 Drawing Sheets

METHOD AND APPARATUS FOR READING AND DECODING INFORMATION

FIELD OF THE INVENTION

The present invention relates to a method and apparatus for reading and decoding information and more particularly to systems for automatically imaging and processing information contained on the surface of an object traveling on a moving conveyor belt.

DESCRIPTION OF THE PRIOR ART

Throughout the world, competition among express package delivery services has reached epoch proportions. In order to maintain or even increase their market share, these organizations are under intense pressure to process packages more efficiently and deliver them to their destinations quicker than their competitors. Although recent hardware and software advances have been made in the area of automated package sorting and routing, further improvements are desirable in order to achieve the economic benefits that would naturally flow from a complete and fully automated process.

Today, modem package processing systems rely on the use of conveyor belts to introduce packages into a processing facility, and to convey them through the facility as they are imaged by a high resolution camera and processed for eventual delivery to a final location. One such system is disclosed in U.S. Pat. No. 5,770,841 to Moed et al., entitled "System and Method for Reading Package Information." Upon arriving at a distribution center, the packages are unloaded from a delivery truck onto a conveyor belt and arranged in single file by a singulator. A package height sensor determines the height of each package and passes the information onto the high resolution camera's focusing system. As each package passes beneath the high resolution camera, an image of the package surface is captured. The digitized image is passed onto an image processing system for automated analysis of the information. Conventional package imaging systems, like that discussed in Moed et al., typically require the stream of packages to be at least singularized (single file) and sometimes even justified (oriented along one side of the conveyor) before they are imaged because they have a very limited in-focus object plane and field of view (FOV). In essence, when two adjacent articles lie in two different focus planes (i.e., they are different distances from the camera), the two articles must be imaged separately or they both will not appear clearly in a single image. Similarly, when two adjacent articles are in the same focus plane but transversely separated, again the articles must be imaged separately or it is likely that only a partial surface of one or both articles will be captured in a single image. Unfortunately, the process of properly singularizing and justifying packages takes valuable time and severely impacts processing throughput. Moreover, the number of packages that can actually be placed on a conveyor belt for processing at any one time is severely restricted when the packages must be placed in single file. Given the speed at which many delivery service conveyor belts operate, the process of focusing, imaging and then re-focusing for each package that must be processed places a significant burden on even the most sophisticated imaging systems.

After the imaging system captures an image of the package, experience has proven that the most error-prone aspect of the process is actually recognizing the handwritten textual information on the package and determining in a timely manner, the package's proper destination from that information. Compounding this already difficult task is the reality that the volume of packages processed by major package delivery companies has reached the level of several million parcels per day and climbing.

In an effort to improve the processing throughput without correspondingly increasing manpower levels, package delivery companies have resorted to the use of high-speed imaging systems optical and intelligent character recognition techniques to quickly image the packages and process the printed and cursive information contained on them. Unfortunately, many of these conventional character recognition engines can only recognize handwritten characters at approximately a 98% recognition rate, which still results in 2–3 errors per package.

Thus, there is a need in the art for an imaging system that allows more latitude in the placement of packages on a conveyor. Furthermore, there is a need for a processing system that provides the capability to quickly and accurately recognize printed and cursive characters beyond that of current systems.

SUMMARY OF THE INVENTION

Systems and methods consistent with this invention provide a apparatus for reading and decoding information extracted from a form. In the system of the present invention, packages are randomly placed on a conveyor belt, with their labels visible to a package imaging camera. As they move along the conveyor belt, the package imaging camera takes an image of a portion of the belt at an instant in time. A digital image of the packages within the field of view of the camera is then transferred to the processing system for analysis. The processing system identifies individual packages in the image, extracts them and then analyzes the information written, or printed on the package labels. The analysis process utilizes conventional Optical Character Recognition (OCR) and Intelligent Character Recognition (ICR) techniques to evaluate the information written on the package label, including check boxes. Once the information is decoded, the system accesses a package record database entry associated with the decoded machine-readable code, or creates a new database entry if necessary. The retrieved database entry is then populated with verified information extracted from the package shipping form. When an unknown word image is encountered, the field-specific recognition process utilizes client-specific or installation-specific lexicon information to aid in the recognition process. The lexicon information is continuously revised and optimized based on processed form information. In a preferred embodiment, verified destination addresses associated with a client are alphabetized or rank-ordered based on frequency of occurrence. Every time an address associated with a client is verified, it is added to the database and the order of the associated destination addresses modified, if appropriate. It is only after the system determines that the originating client is not stored in the database does it resort to a ZIP+4 or similar database to verify a destination address.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION

Figure 1:
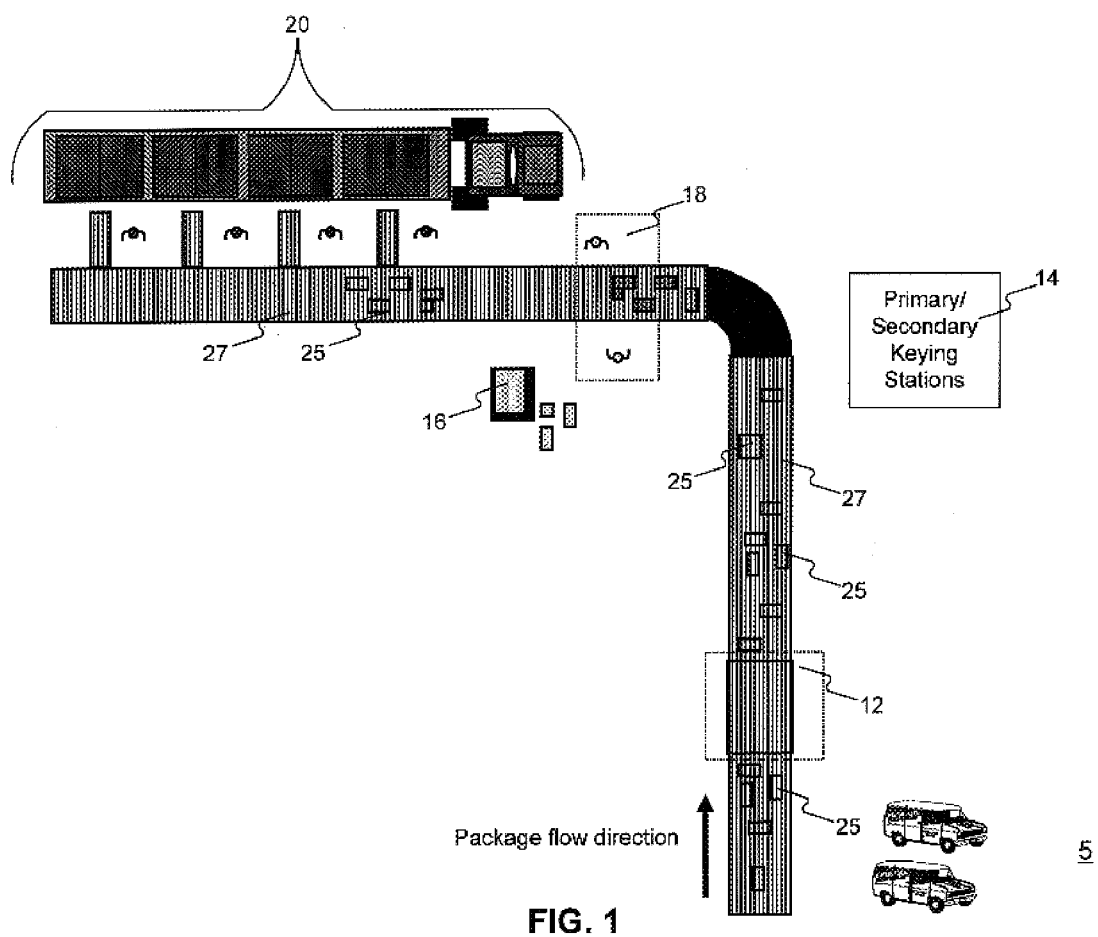
FIG. 1 is a pictorial representation of a package processing facility in accordance with the present invention.

In the following detailed description of the preferred embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, workstations, or personal computers are connected via communication links of various types. In a client server arrangement, programs and data, many in the form of objects, are made available by various members of the system.

In accordance with the invention, users at remote terminals in a network communicate through the network to a server or a web site and are able to download data from the server or web site to the user's client workstation. As this embodiment of the invention is described herein, a web browser program on a client workstation for browsing a network, such as the Internet, will be referred to as the browser, while the server workstation with which the browser station is communicating during a download will be referred to as the server.

A system in accordance with the present invention, comprises a plurality of computer terminals and servers. Each type of computer may be generally similar to every other type of computer including a central processing unit, display device, and operator input device. Moreover, it will be appreciated that each type of computer may also perform operations described herein as being performed by every other type of computer. The distributed system may comprise any one of a number of types of networks over which client computers and server computers communicate, including local area networks (LANs), wide area networks (WANs), the Internet and any other networks that distribute processing and share data among a plurality of nodes. The on-line services typically provide functionality such as electronic mail (email), file transfer protocol (FTP), and World Wide Web (WWW) access.

The WWW is a graphical subnetwork of the Internet. With common "web browser" software such as Mosaic or Netscape Navigator, users may easily access Internet information and services on the WWW. The browser handles the function of locating and targeting information on the Internet and displaying information provided by a server. The WWW utilizes the technology called "hypertext" to organize, search, and present information on the Internet. Using the browser, a user can select a word ("hypertext word") from a viewed document, and be linked to another document featuring information related to that word. These links are within the Web server domain and result in a progressively deeper search or base of choices.

In the business arena, a service provider can, with an Internet address and a hypertext editor, develop a hypertext document called a "home page," which a user may explore visiting the provider's Web server. The home page furnishes information about the service offered by the provider through use of graphic images, sound, hyperlink choices, etc. With that information, the user is guided through the home page to select the service and desired service features.

Referring now in more detail to the drawings, in which like numerals refer to like parts throughout the several views, FIG. 1 illustrates a pictorial representation of a typical package distribution facility 5 for processing packages. Each package distribution facility 5 is comprised of a image capture station 12, a plurality of keying stations 14, an exception handling station 16, a labeling station 18, and a package loading station 20. Packages 25 enter the facility at the bottom of the figure, near image capture station 12, and proceed up and to the left toward package loading station 20. However, as known by those skilled in the art, package flow can proceed from either direction, and conveyor belt 27 can assume any shape. The packages 25 depicted in FIG. 1, vary in height, weight and size, and may be oriented arbitrarily on the conveyor belt 27. The only positional requirement is that the package identifying information, mailing label, or processing form must be visible to the imaging system.

Figure 2:
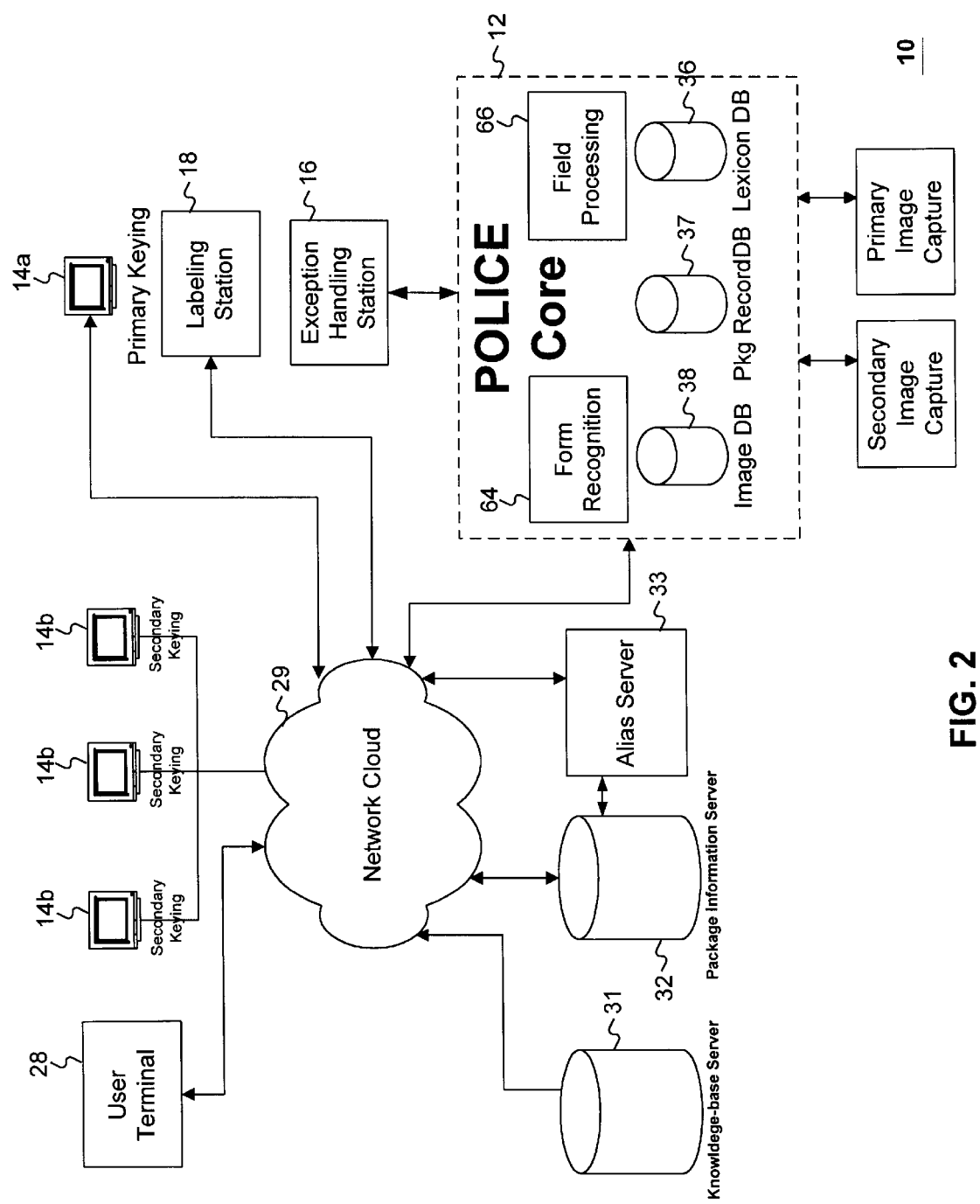
FIG. 2 is a graphical representation of a package processing system in accordance with the present invention.

FIG. 2 illustrates a block diagram of the present invention as partially depicted in FIG. 1. As shown in FIG. 2, package processing system 10 is designed to communicate across a network 29. The package processing system 10, is comprised of a plurality of interconnected computers and microprocessors hosting a plurality of operating systems. By way of example, the network can be comprised of pentium™ based microprocessors operating on Windows/NT, UNIX and/or Windows/CE operating systems. FIG. 2 further shows that package processing system 10 is comprised of a knowledge-base server 31, a package information server 32, and an alias server 33. As will be explained later, knowledge-base server 31, package information server 32, and alias server 33 contain information that can be accessed by users logged onto the system 10 who want to retrieve information stored on one of the servers. Each server is programmed to respectively store knowledge-base, package or tracking information for use by a customer located at a user terminal 28. For example, a customer who wants to determine the location of her in-transit package will access alias server 33 via a browser operating on user terminal 28, which in turn, may access the package information server 32 to answer the customer's query. A user at a system user terminal 28 can access the system 10 through network 29 from virtually any location over either a wireless or a hard-wired interface. User terminals 28 interfacing with the system 10 via a wireless interface communicate with rest of the system 10 over the airwaves at radio frequencies, while users coupled to the network via a hard-wired interface communicate with the rest of the system 10 over a wire or fiber optic medium.

As will be explained later, when package processing system 10 identifies a package 25, it either creates a new package record database entry or updates an existing entry as a way of maintaining an accurate status of each package processed by the system. Image capture station 12 as shown in FIG. 2, is further comprised of a lexicon database 36, package record database 37 and an image database 38, form recognition module 64 and a field processing module 66. Image capture station 12 and its components will be explained in greater detail below.

Figure 3:
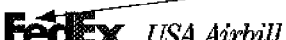
FIG. 3 is an example of a form that may be processed by the present invention.

FIG. 3 illustrates a typical form 40 that is processed by package processing system 10. Form 40 includes a source address 42, a destination address 44, machine-readable code 46a, fiduciary marks 48, and shipping information 50. Source and destination addresses 42 and 44, respectively, typically consist of two to four lines of alphanumeric text, with destination address 44 located below source address 42. Machine-readable code 46a typically comprises a one-dimensional or two-dimensional bar code or symbology. In a preferred embodiment, machine readable code 46a will consist of a two-dimensional probability density function (PDF) 417 bar code. A plurality of fiduciary marks 48 are positioned on form 40 at predetermined locations to aid system 10 in identifying and properly decoding an imaged form. Form 40 also includes shipping information 50 that may be recorded on the form through the use of check boxes. For the sake of clarity, this description assumes that the form consists of information necessary to deliver it and an associated package 25, to a predetermined destination. It should be understood that form 40 may contain any kind of information and it may or may not be associated with a package for delivery.

Referring again to FIG. 1, the components and operation of the package processing system 10 will be described in additional detail. As packages are placed on conveyor belt 27, they are transported first to image capture station 12 whose function is to capture an image of the packages that transit image capture station 12 by repeatedly capturing images of conveyor belt 27 over a predetermined period of time. During the period of time from when the image capture station 12 captures an image of package 25, until the package reaches labeling station 18, package processing system 10 extracts individual forms 40 from the captured image, analyzes the information written on the form, and creates a routing label for the package. Since image capture station 12 does not image individual forms, processing system 10 first isolates each form 40 in a captured image before the information on each form 40 can be decoded. Once an individual form is identified, system 10 determines those packages that already have routing labels affixed to them. A routing label is comprised of a 32 digit special ASCII machine readable code, and an optional two-dimensional symbology. It identifies the attributes required by the application of: the database record identifier associated with the package, the source and destination addresses, special handling procedures for the package, and an identifier of the form that was originally associated with the package. The routing label may also include human-readable, alphanumeric text. Parties that ship a high volume of packages may be supplied with a routing label generating system that allows routing labels to be affixed to packages before they arrive at package processing system 10. After processing system 10 determines that a package does not have a routing label, it identifies form 40, locates and decodes information on form 40, and if necessary, builds a package record database entry. If the system is unable to perform any of the preceding tasks (with the exception of locating the routing label), exception handling station 16 is alerted, and the problem is corrected there. When package 25 arrives at labeling station 18, a routing label is created, if necessary, and affixed to package 25 before the package is permitted to proceed to package loading station 20.

Figure 4:
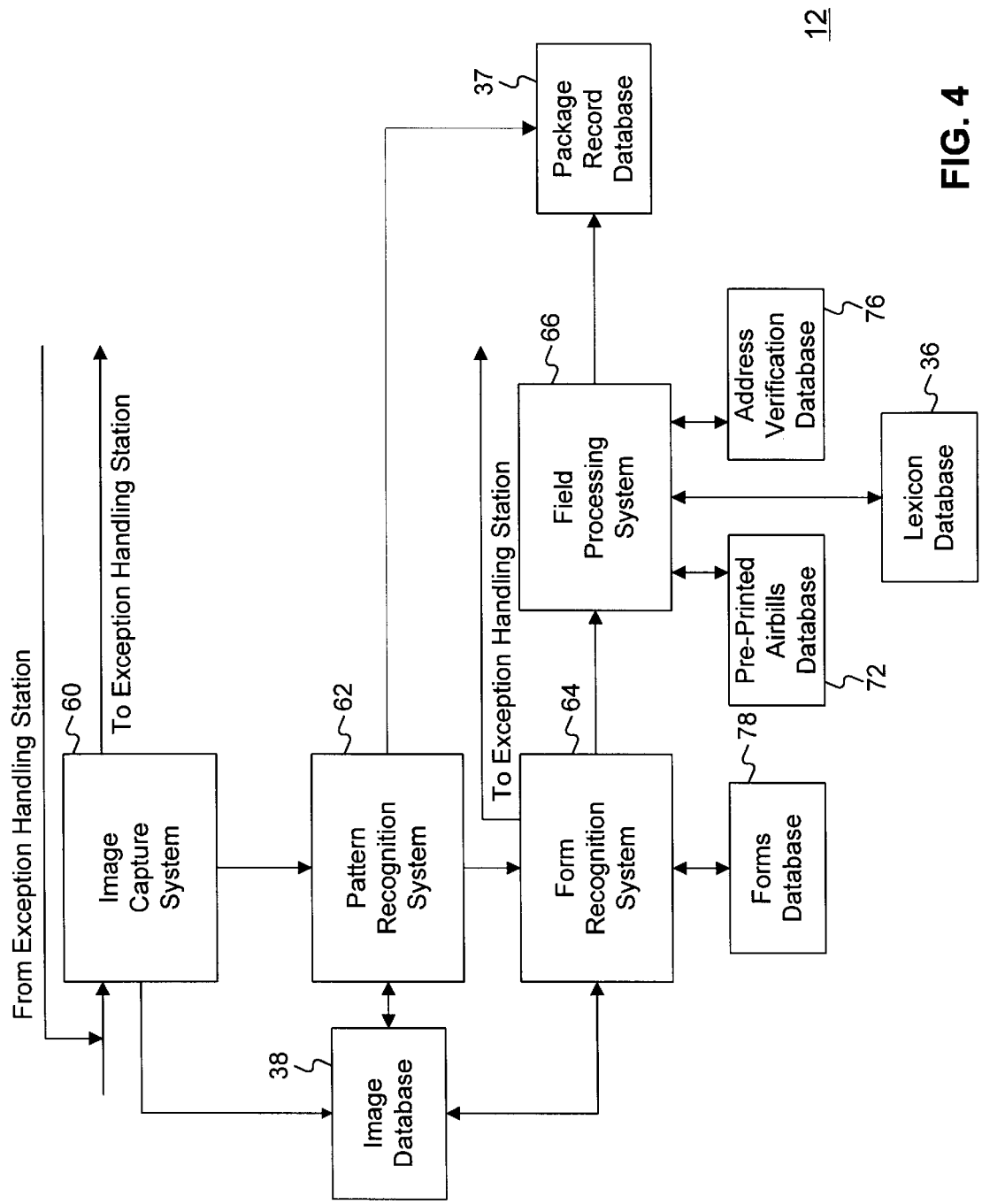
FIG. 4 is a detailed block diagram of the primary image capture station in accordance with the present invention.
Figure 5:
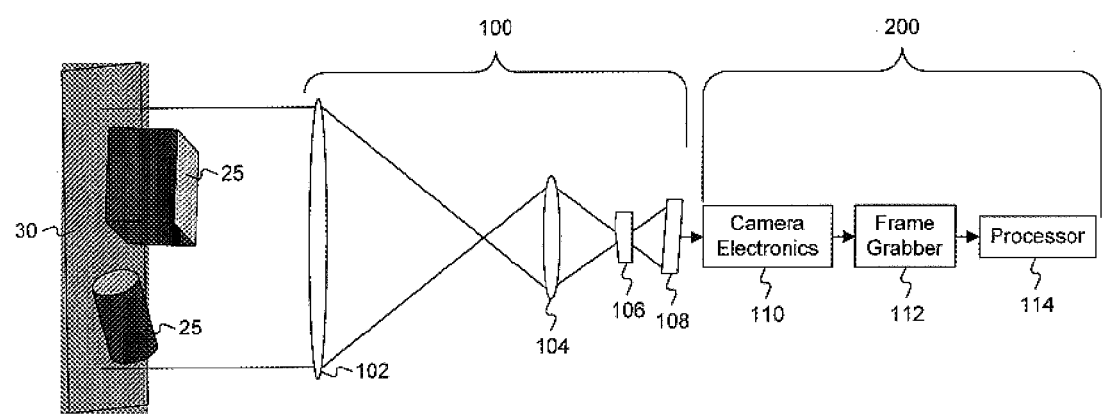
FIG. 5 is a pictorial drawing of the image capture system in accordance with the present invention.

The operation of each package processing station will now be described in more detail. As shown in FIG. 4, image capture station 12 includes an image capture system 60, a pattern recognition system 62, a form recognition system 64, and a field processing system 66. As shown in FIG. 5, image capture system 60 includes an imaging module 100, and an electronics module 200. Imaging module 100 is comprised of a primary lens (or mirror) 102, a secondary lens (or mirror) 104, a phase mask 106, and at least one detector 108. In operation, imaging module 100 continuously captures high resolution images of a segment of conveyor belt 27, including the packages 25 located on the conveyor belt segment at any instant in time. Unlike prior art package imaging systems, imaging module 100 is capable of simultaneously capturing a clear image of the top surfaces of a plurality of packages 25, regardless of the height of the packages. It also is capable of imaging the packages 25 traveling on conveyor belt 27 without aligning them beforehand. Conveyor belt 27 is imaged through primary lens 102, secondary lens 104, and phase mask 106, onto detector 108. Phase mask 106 varies the phase of the light transmitted through it. It is composed of an optical material having variations in opaqueness, thickness or index of refraction. Phase mask 106 is designed to alter an incoherent optical system (one that only detects and processes the signal intensity) in such a way that the system response to a point object or point spread function (PSF) is relatively insensitive to the distance of the point from primary lens 102, over a predetermined range of object distances. In addition to providing a capability to simultaneously image a plurality of packages regardless of their height, this arrangement minimizes distortion of the package label images on curved and tilted surfaces, resulting in improved performance of algorithms used subsequently to decode bar codes and to perform character recognition. The output of phase mask 106 is sampled by detector 108, amplified by camera electronics 110, and digitized in frame grabber 112 for processing by processor 114.

Figure 6:
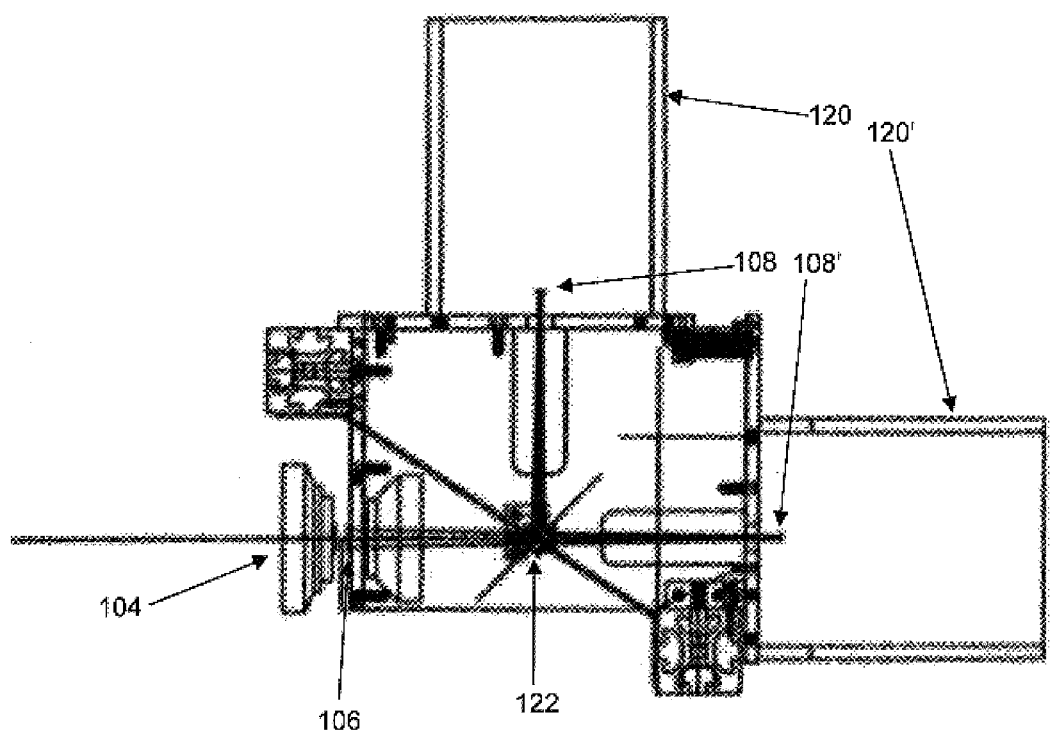
FIG. 6 is a pictorial drawing of the two-camera subassembly in accordance with the present invention.

Character recognition for automated package routing, as is known by those skilled in the art, requires high resolution imaging (at least 200 dots per inch). Capturing an entire image of conveyor belt 27 (which is typically 3–5 feet wide) at this resolution, requires 9–15,000 pixels across the belt 27. To perform this task, image capture system 60 utilizes an imaging module 100 that consists of a two-camera subassembly 116. As shown in FIG. 6, two-camera subassembly 116 is constructed of two high resolution cameras 120 and 120' oriented 90° apart. Each high resolution camera 120 and 120' is preferably either a line scan or time delay integration (TDI) camera for continuously imaging the moving conveyor belt 27. As shown in FIG. 6, phase mask 106 is positioned in the aperture stop behind secondary lens 104. A small beamsplitter 122 is placed in the converging beam behind phase mask 106, splitting the image to the two detectors 108 and 108'. This assembly allows the two cameras to image conveyor belt 27 through a common optical path. The use of beamsplitter 122 allows each camera's field of view (FOV) to either be identical, overlapped to varying degrees, or completely separate. In the preferred embodiment, the two cameras image separate (left and right) sides of conveyor belt 27 with an overlap of only approximately one percent of each camera's FOV. Consequently, the resolution achieved with this approach is almost double that of the widest high resolution cameras available.

Figure 7:
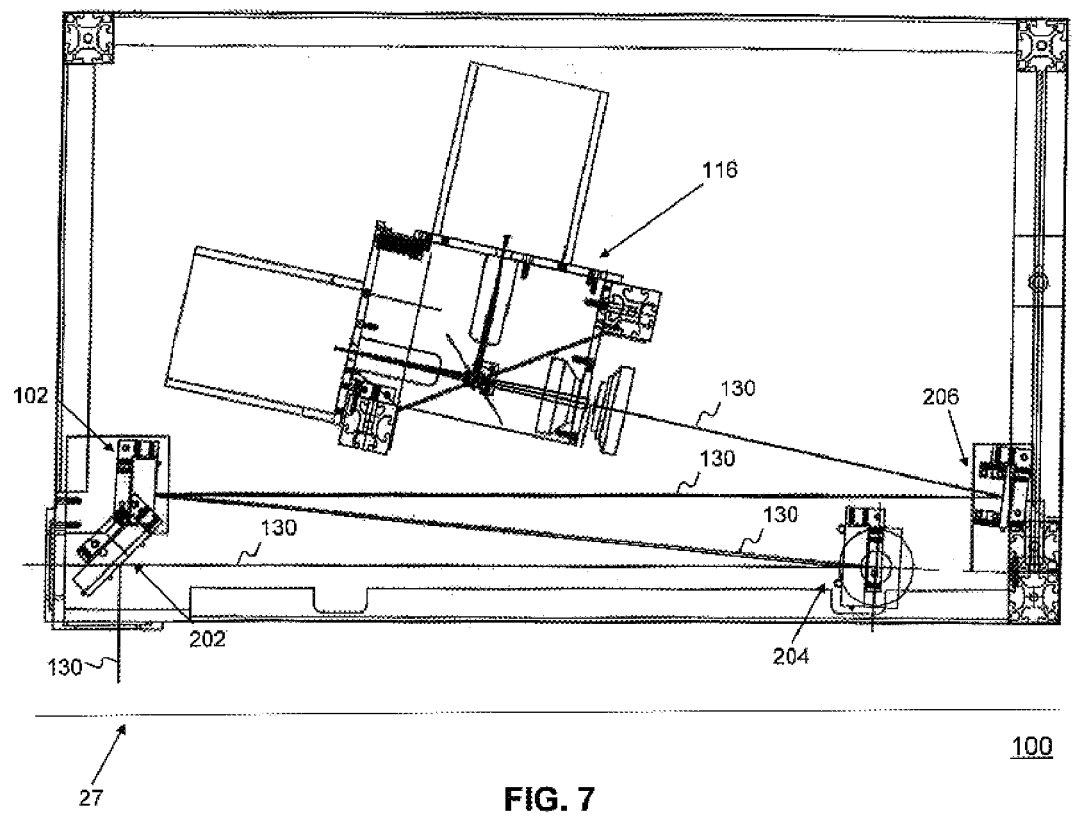
FIG. 7 is a side view of the imaging module in accordance with the present invention.

FIG. 7 illustrates a side view of imaging module 100 (as shown in FIG. 5). In addition to the components previously discussed, imaging module 100 further comprises fold mirrors 202, 204, and 206 for directing a beam of light from conveyor 27 onto secondary lens 104. As shown in FIG. 7, light reflected by objects on conveyor belt 27 travels along a beam 130, and is first reflected into imaging module 100 by fold mirror 202. Light beam 130 then passes to fold mirror 204, primary mirror 102, fold mirror 206, and on to the two-camera subassembly 116.

Figure 8:
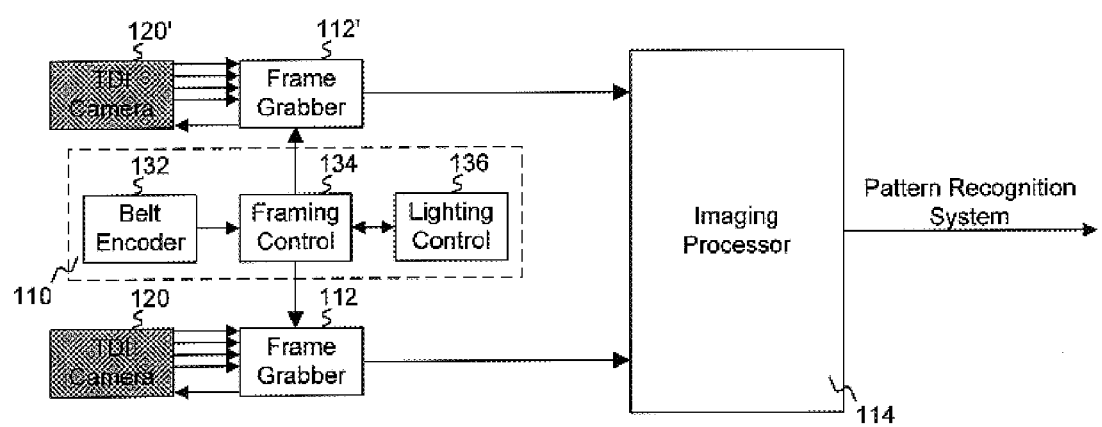
FIG. 8 is a detailed block diagram of the electronics module of the image capture system.

FIG. 8 illustrates the electronics module 200 (FIG. 5). As discussed with reference to FIG. 5, electronics module 200 is comprised of camera electronics 110, a frame grabber 112, and a processor 114. As shown in FIG. 8, camera electronics 110 comprises a belt encoder 132, a framing control processor 134, and a lighting control unit 136. Each of the two cameras 120 and 120' transmits images to frame grabbers 112 and 112', respectively for digitization. Frame grabbers 112 and 112' process the images and, in response, feed back camera control signals to cameras 120 and 120'. Camera scans are synchronized with conveyor belt motion through the use of framing control processor 134, that performs frequency multiplication on belt encoder pulses to maintain a relatively constant scan resolution. Framing control processor 134 also controls illumination levels of cameras 120 and 120' through the use of lighting control unit 136 that maintains a relatively constant image brightness as a function of belt speed. Imaging processor 114 then performs pixel-by-pixel image correction and analysis, and stores the image in image database 38 (as shown in FIGS. 2 and 4), before passing the processed image to pattern recognition system 62 for additional processing. While described as a system comprising a single imaging processor 114, it should be understood by those skilled in the art that any number of imaging processors 114 could be utilized. For example, if two imaging processors are used (one each for cameras 120 and 120'), they would communicate together and coordinate the transmission of partial images to one another, to "stitch" together the picture of fields whose image crosses both cameras. In any event, processing for the image decoding operation can be implemented with a two-dimensional convolution operation in the time domain. However, the computational throughput requirements for a large two-dimensional convolution at the high resolutions required must be considered, especially at the fastest belt speeds used in practice. For example, it takes a minimum of 1.5 teraflops (1,500,000 megaflops) to implement a 64×64-element convolution across a 5-foot-wide belt running at 500 feet/minute. To reduce the computational requirement, phase mask 106 in the described implementation is encoded with a separable PSF that is decoded using two orthogonal, one-dimensional convolutions. In the above example, the number of calculations is reduced by a factor of 32.

Figure 9:
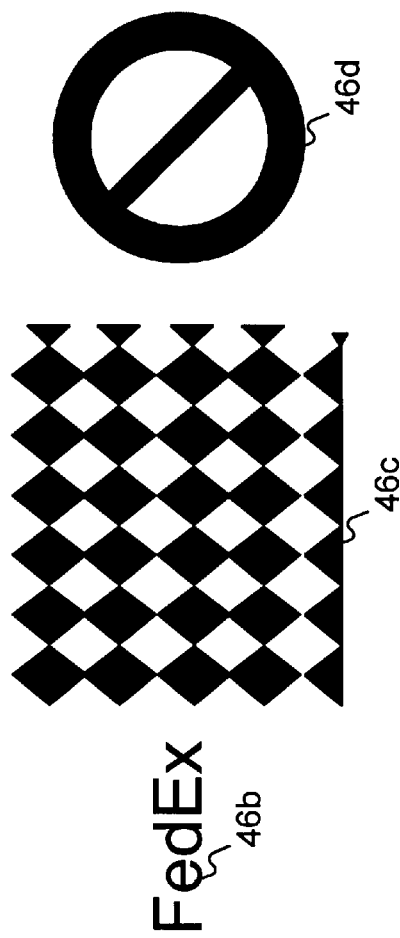
FIG. 9 is pictorial representation of various predetermined patterns that may be identified by the pattern recognition system of the present invention.
Figure 9:
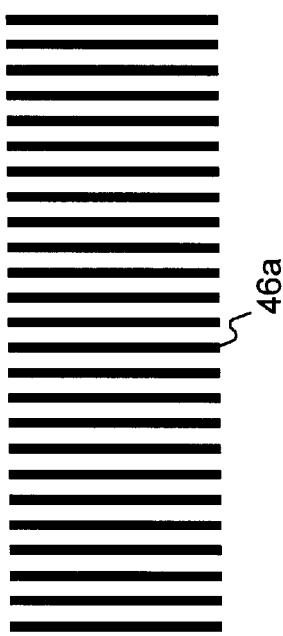

When pattern recognition system 62 (as shown in FIG. 4) receives the digitized image, it performs a line-by-line analysis of intensity data from the captured image to locate a predetermined pattern. While any number of patterns can be used, FIG. 9 shows four examples of patterns that may be used in accordance with the present invention. As shown in FIG. 9, pattern 46 can be a machine readable code 46a, text 46b, a repetitive pattern 46c, or a picture 46d. For the purposes of this detailed description, it will be assumed that predetermined pattern 46 is a machine readable code 46a. Since the image capture station 60 images portions of the conveyor belt 27, not individual packages 25, there is always the possibility that a partial pattern may be captured in a single image. In the event that the pattern recognition system 62 determines that only a portion of the pattern has been captured in the present image, it will first ascertain where the remaining portion of the pattern 46 can be found (the top or bottom of the current image). If the remaining portion is found at the top of the current image (indicating that the rest of the pattern 46 was captured in the previous image) it will retrieve the remaining portion of the pattern 46 from the image database 38 and complete processing. If the pattern recognition system 62 determines that the remaining portion of pattern 46 is found at the bottom of the current image (indicating that the rest of the pattern has not been captured) it will defer further processing of the pattern 46 until the remaining portion has been captured. When the pattern recognition system 62 has located all of the images necessary to encompass the complete pattern 46, it will stitch the separate portions together to create a composite pattern, and processing will continue.

After the pattern recognition system 62 detects machine readable code 46a, it determines whether the code corresponds to a routing label and if appropriate, updates the corresponding record in the package record database 37. As explained earlier, no further processing is required when the pattern recognition system 62 determines that the machine readable code 46a is a routing label.

If the machine readable code 46a is not a routing label, package processing flows to the form recognition system 64 which locates fiduciaries 48 on form 40 and determines a region of interest (ROI) based on the position and orientation of machine readable code 46a and fiduciaries 48. The ROI is then extracted from the captured image for further processing. As in the case with the pattern recognition system 62, there is a possibility that while an entire pattern 46 is captured in a single image, the ROI may actually lie in two or more successive images. In the event that the form recognition system 64 determines that a single form is captured in a number of successive images, processing will proceed as previously discussed with reference to the pattern recognition system 62. That is, the form recognition system 64 will access image database 38 and retrieve the remainder of a previously stored form or suspend processing until the entire form 40 has been captured. It is important to note that the size of the ROI varies based on the size of the detected pattern, and in any event will be limited by the size of the largest form stored in forms database 78.

Operation of pattern recognition system 62 is further explained by way of an example. Form 40 shown in FIG. 3 is representative of a typical form that would be imaged by image capture system 60. When pattern recognition system 62 receives the digital image of form 40, a processor operating in the pattern recognition system 62 analyzes the scan data captured from the form image and attempts to locate machine readable code 46a on form 40. Once the pattern recognition system 62 locates machine readable code 46a, it transfers the image to the form recognition system 64 that then locates the fiduciaries 48 on the form, computes ROI 49, extracts the region bounded by the ROI 49 from the captured image, and identifies the imaged form.

As shown in FIG. 4, form recognition system 64 accesses the forms database 78 to carry out the identification of the imaged form. Whenever a form is added to forms database 78, the locations of all fields, field characteristics, pattern-to-fiduciaries relationships and intra-field relationships are stored for access by form recognition system 64. Any form, even another vendor's (e.g., UPS) can be stored in forms database 78. In operation, form recognition system 64 compares the spatial relationship between the observed pattern 46 and fiduciaries 48 with enrolled pattern-to-fiduciaries relationships stored in forms database 78 to identify the captured form. Form recognition system 64 includes general purpose and high performance computers that interface with forms database 78 to identify the imaged form for further processing by field processing system 66. The form recognition process can use any physical characteristic of form 40, such as field location, symbols, or form size to aid in the identification process. Furthermore, if the pattern 46 on form 40 is a machine-readable indicator, its content may also be used as part of the identification process. If the form-recognition process fails, the image is forwarded to exception handling station 16 for manual processing. Once form 40 has been identified, its identity and associated image data are then transmitted to field processing system 66.

In addition to receiving the imaged form and its identity from form recognition system 64, field processing system 66 also receives the location of all the data fields on the imaged form, the field characteristics and the intra-field relationships to aid in the analysis of the imaged form. The field data can be machine printed, handwritten (printed or cursive) machine-readable, check box, or a combination of the above. As shown in FIG. 4, field processing system 66 accesses a pre-printed airbill database 72, a lexicon database 36, and an address verification database 76 to decode the information written on the imaged form. The recognition is enhanced by using underlying lexicon information that can be used in both the character recognition and verification of processed fields. Once the fields on the form are processed, the system performs package-to-record correlation in which the package information is correlated to an existing entry in the package record database 37, or a new entry is built. Information stored in the package record database 37 can then be recalled for the purpose of generating a routing label comprising the captured information. A routing label can also be generated that is an identifier that references the captured information, or is a combination of the two approaches. The captured label information is then correlated to the physical object (package) containing the form 40 by a secondary capture of the machine readable code 46a present on the object. This capture is performed by an operator at labeling station 18. It locates the stored information in package record database 37 and produces a routing label.

Figures 10, 10A, 10B:
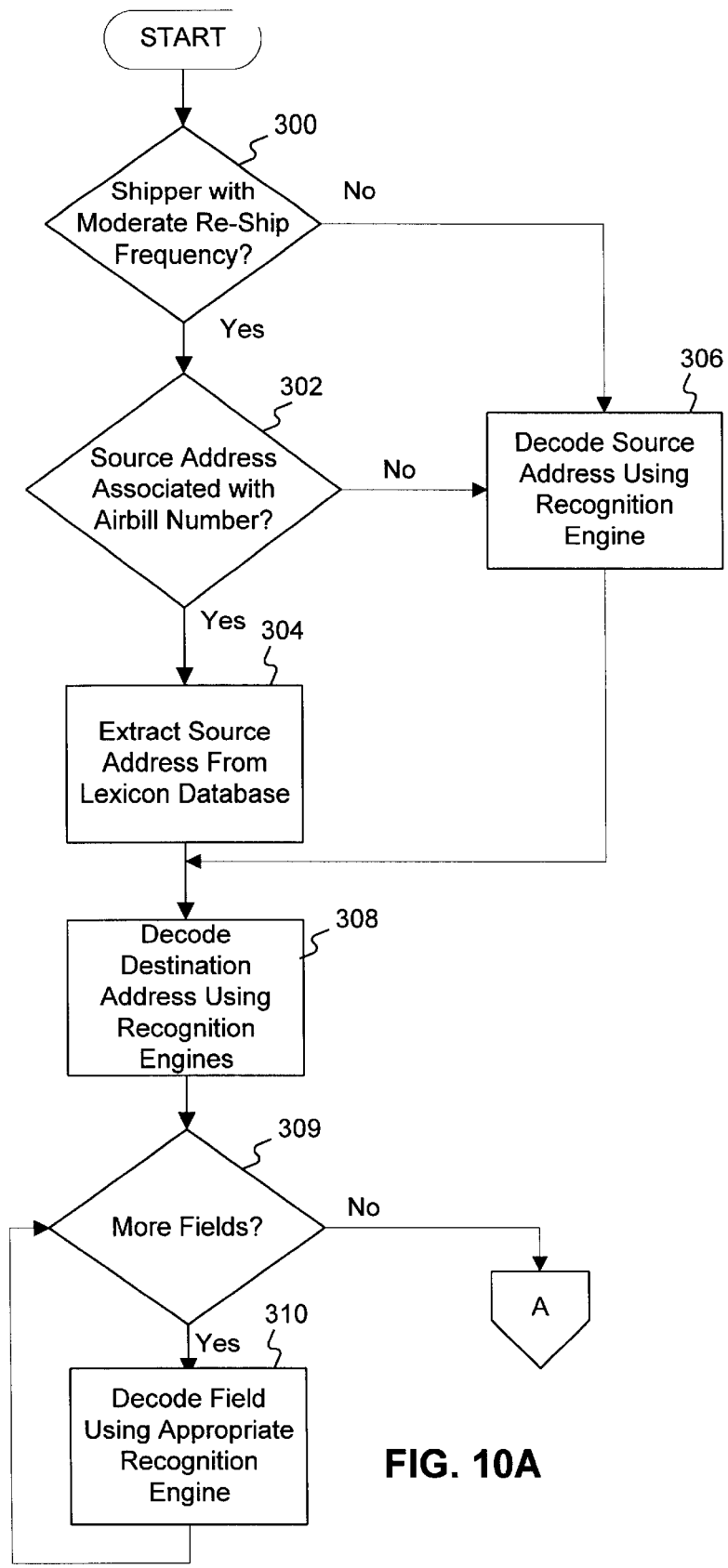
FIGS. 10 and 11 are detailed flow diagrams of the method of field processing in accordance with the present invention.
Figure 10B:
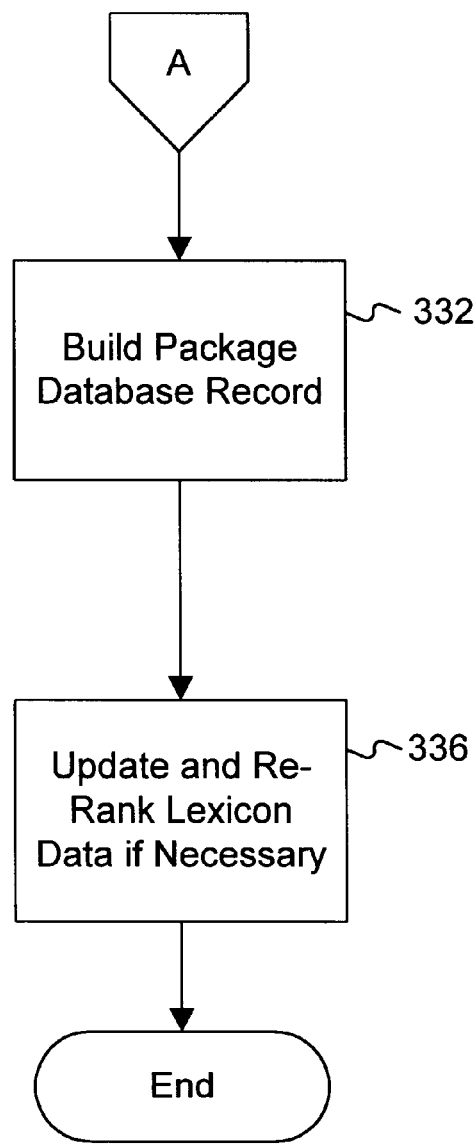

FIG. 10 is a functional flowchart of field processing system 66 in accordance with the present invention. An element of this system is its ability to supplement specialized OCR/ICR processing with a lexicon analysis to quickly and efficiently identify the best match for an unverified string, or to identify a small number of high probability candidates to be reviewed by a human operator located at a primary or secondary keying station 14a and 14b, respectively. The selection of recognition engines (OCR/ICR, bar code, and 2D symbology decode engines, etc.) will be driven by the characteristics of the fields to be processed. This additional process, provides the use of context information in conjunction with the OCR/ICR analysis to improve the level of accuracy realized by the system. When necessary, the field-specific recognition process is aided by the use of installation-specific lexicon information that is continually revised and optimized based on processed form information.

An example of such a lexicon would be a list of city names in the United States (or international country codes) corresponding to the frequently identified destinations for packages originating with a particular user. When the system determines that a package originating with a user contains an unverified string, instead of accessing the enormous address verification (ZIP+4) database 76, field processing system 66 would instead access a considerably smaller and more manageable lexicon that would only contain a maximum of approximately 1000 valid entries, tailored for that user.

As described in detail below, there are two phases of the present method: (1) use of a database in concert with a recognition engine and lexicon to dynamically manipulate the string and resolve ambiguities, or alternatively arrive at a short list of candidate strings to be resolved by a human operator (FIG. 10*a*); and (2) updating the lexicon in view of the processed form (FIG. 10*b*).

Referring to FIG. 10*a*, the field processing system 66 first determines whether the decoded machine readable code 46*a* is associated with a shipper of moderate re-ship frequency (step 300). In a preferred embodiment, shippers with a moderate re-ship frequency have airbill numbers pre-assigned to them, and can be identified by accessing pre-printed airbills database 72 (FIG. 4) with the decoded machine readable code 46*a* as the input argument. Shippers with a moderate re-ship frequency also have associated data records stored in lexicon database 36 (FIG. 4) that correspond to package destinations most frequently utilized by the shipper. The field processing system 66 accesses lexicon database 36 to assist in the verification of decoded information. In some cases (e.g., when the shipper sends packages from a small number of addresses), information from lexicon database 36 can be directly copied into package record database 37 in lieu of the time-consuming process of decoding the form data. If the decoded machine readable code 46*a* is not associated with a shipper of moderate re-ship frequency, processing flows to step 306. If, on the other hand, the decoded machine readable code is associated with a shipper of moderate re-ship frequency, processing flows to step 302, where the system determines whether there is a single source address 42 associated with the decoded machine readable code 46*a*. If there is a single source address 42 associated with the decoded machine readable code 46*a*, processing flows to step 304 and the source address is extracted from the pre-printed airbills database 72. If there is not a single source address 42 associated with the decoded machine readable code 46*a*, processing flows to step 306. In step 306, the field processing system 66 decodes the source address 42 using the most appropriate recognition engine (OCR or ICR), depending upon the format of the data to be decoded. Next processing flows to step 308 where field processing system 66 decodes the destination address 44 using a recognition engine. In step 309, the system determines whether there are more fields to be decoded. If there are, processing flows to step 310 and the next field is decoded. Otherwise, processing flows to step 332 (as shown in FIG. 10*b*) where field processing system 66 updates package record database 37 with information from the decoded form. Next, at step 336, field processing system 66 updates and re-ranks the user's lexicon data stored in lexicon database 36 and then terminates.

Figure 11:
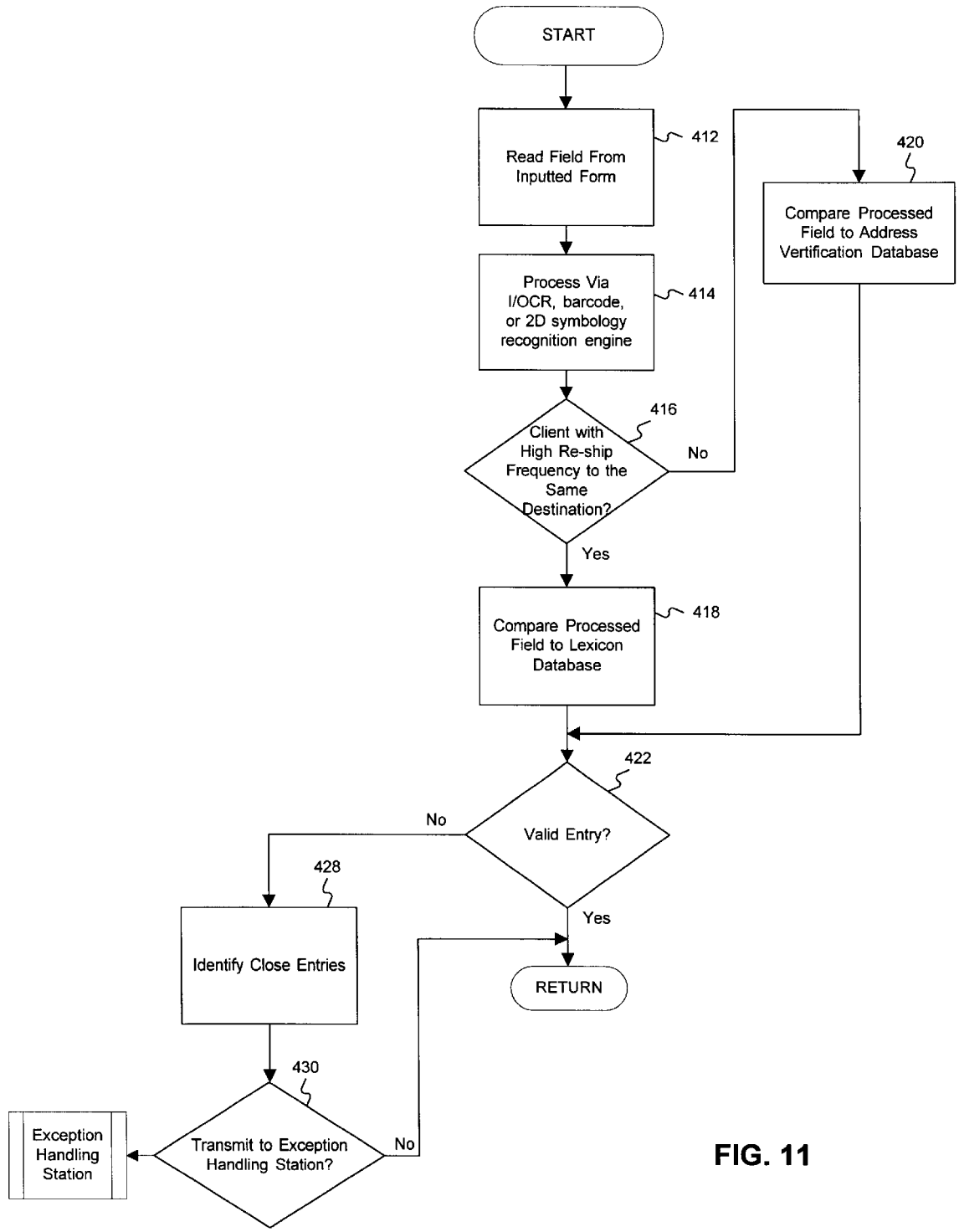

FIG. 11 illustrates a flow chart of the decoding process performed by the field processing system 66 in steps 306, 308, and 310 of FIG. 10A. In step 412, the desired field is read from the imaged form 40. The retrieved data is then processed in step 414 using a field-specific recognition engine to verify the information in the retrieved field. As is known by those skilled in the art, traditional recognition engines (I/OCR) simply analyze input strings on a character-by-character basis. When a complete word has been analyzed, the processor may then compare the analyzed word to a spell checker as a means of further verifying the character-by-character analysis. Once the data has been analyzed by the recognition engine, processing flows to step 416 where the field processing system 66 determines whether the shipper is one that re-ships with moderate frequency to the same destination (step 416). If the shipper is not a shipper that ships packages with moderate frequency to the same destination, the processed information is compared to information stored in the address verification database 76 (step 420). Otherwise, the information processed in step 414 is compared to the smaller lexicon database 36 (step 418). Comparing the analyzed data with an entry in the appropriate database, improves the possibility that the word has been analyzed correctly.

Once the information is compared to either the appropriate record in lexicon database 36 or address verification database 76, field processing system 66 then determines whether the processed information constitutes a valid entry (step 422). A valid entry is one that is either identical to an entry in the selected database or one that sufficiently matches an entry to a predetermined degree. If the entry is determined to be valid in step 422, the decoding process completes.

If the entry, as evaluated in step 422 is not valid, processing flows to step 428 where the system retrieves similar entries from the appropriate database and then transmits the record with the identified entries to a primary 14*a* or secondary keying station 14*b*, depending upon the nature of the unverified information. Primary keying stations 14*a*, as shown in FIG. 2 are co-located at package distribution facility 5, while secondary keying stations 14*b* may be located anywhere that provides network access to the package processing system 10. Data that must be decoded immediately for creation of a routing label (e.g., source address 42, destination address 44, etc.) is routed to an on-site primary keying station 14*a* and data that is of secondary importance (i.e., it is not utilized to create a routing label) is transmitted to an off-site secondary keying station 14*b*. Primary keying stations for one facility may be secondary keying stations for another facility. If the operator located at a keying station 14 cannot decode the information, the package is removed from conveyor 27 and routed to exception handling station 16 (step 430) for a visual examination of the package. Otherwise, processing terminates.

Each processed form is handled as a separate data record. The data record contains processed information and/or image information from the form. The record may be supplemented with references to other records if the system detects that a multi-form case applies to the same package. In addition, an auto-generated record identifier may be included in the record. This allows for a standard method of accessing the captured information and encoding a reference to it in a bar code or 2D machine-readable format. It also allows for convenient use of alias server 33 (FIG. 2) by a user wishing to track the status of an in-transit package. As previously discussed, when package 25 is imaged and processed, data from the surface of package 25 is used to populate an entry of package record database 37. Once a package record database entry is created, a user will have read-only access to package routing information contained in the package record database 37, for the purpose of tracking the progress of package 25 from source to destination. Since a user accessing alias server 33 normally will not know the record identifier for the newly created package record database entry, alias server 33 provides the capability to locate package 25 using any information retrieved from the surface of package 25. For example, a shipper may retrieve specific package routing information from alias server 33 by simply entering the source address 42, destination address 44, airbill number 46a, or a combination thereof. While it may not be possible to isolate a specific package based solely on the source address 42 or destination address 44, alias server 33 nonetheless provides the capability to identify a collection of packages that satisfy the entered criteria.

Figure 12:
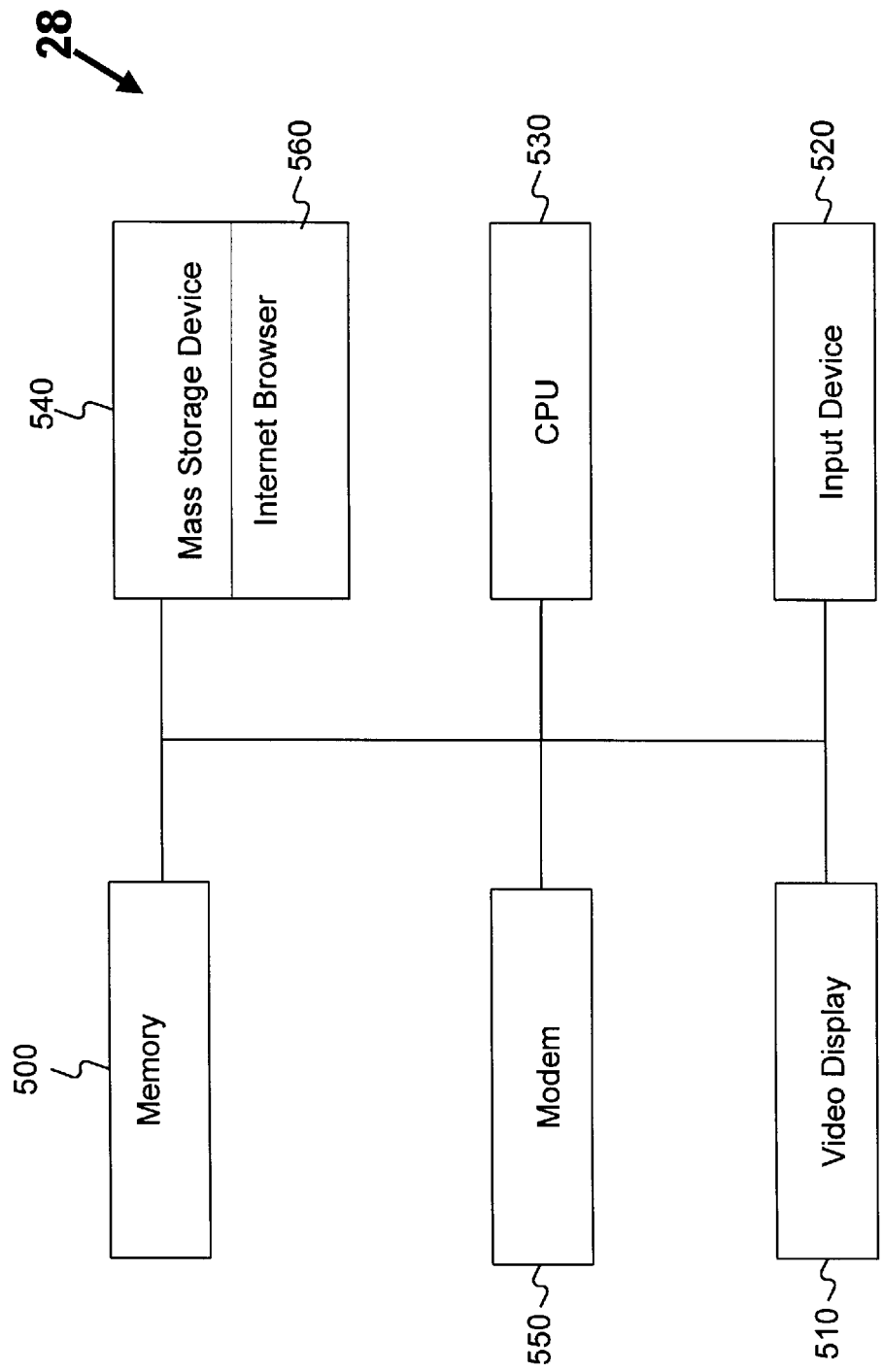
FIG. 12 is a detailed block diagram of the user terminal of FIG. 2.

As shown in FIG. 12, user terminal 28 preferably includes a main memory 500, a display device 510, input device 520 such as a keyboard and a pointing device (e.g., mouse, track ball, pen, slide pointer, or similar device), a mass storage device 540, and a central processing unit (CPU) 530 for performing various functions related to retrieving and viewing WEB pages stored on the Internet. These components communicate through a system bus or similar architecture. Additionally, the user terminal 28 is preferably connected to an internal or external modem 550 or like device for communication with network 29. Alternatively, user terminal 28 may be connected via an Integrated Services Digital Network (ISDN) adapter and an ISDN line for communications with network 29. Mass storage device 540 of user terminal 28 maintains an Internet browser 560 for directing CPU 530 to perform various functions related to retrieving and viewing WEB pages stored on the Internet.

Figure 13:
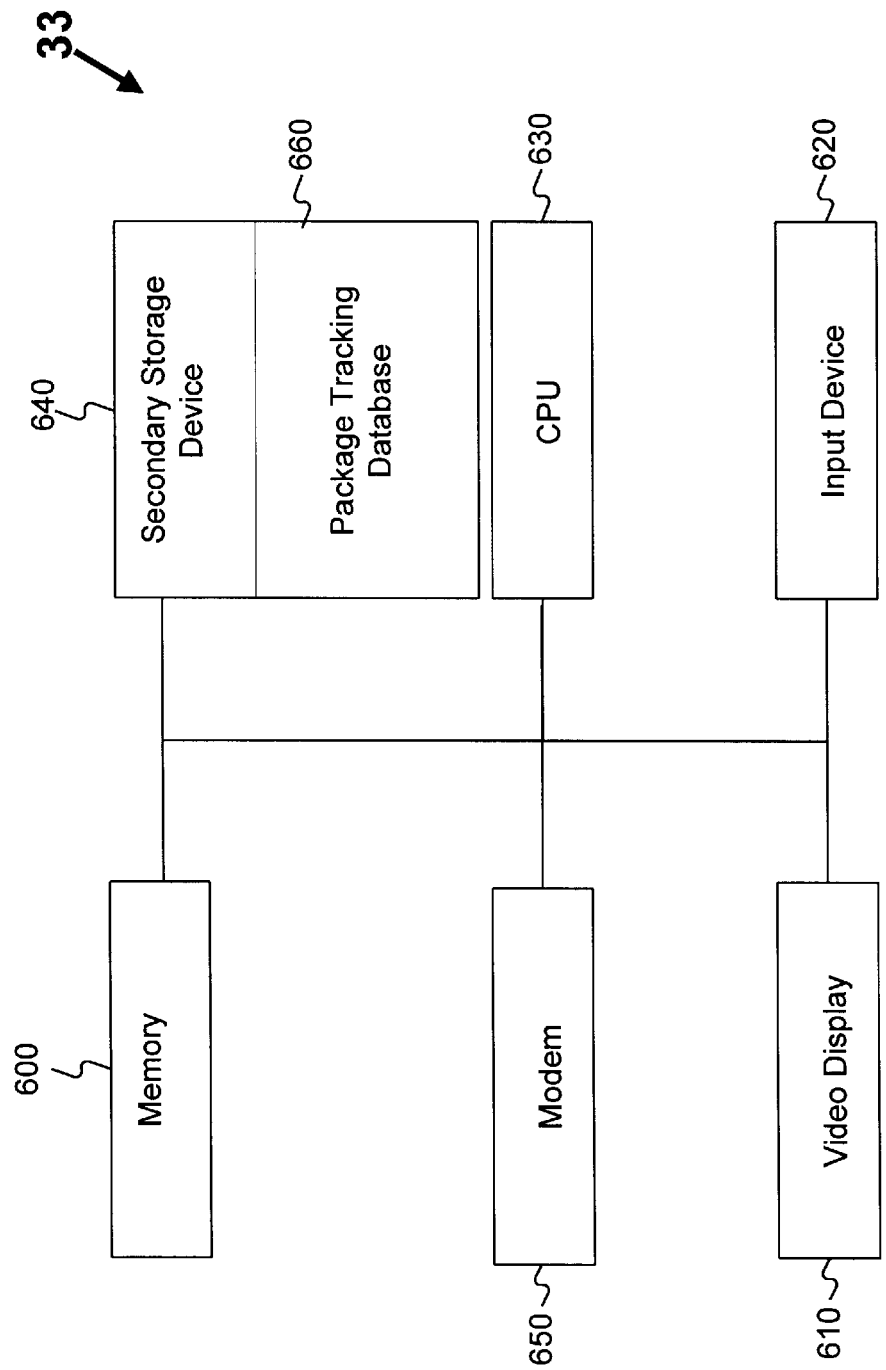
FIG. 13 is a detailed block diagram of the alias server of FIG. 2.

FIG. 13 is a diagrammatic representation of an alias server 33 in accordance with the present invention. As shown in FIG. 13, alias server 33 is comprised of a main memory 600, a display device 610, input device 620, a mass storage device 640, a CPU 630 and an internal or external modem 650. As further shown in FIG. 13, the mass storage device 640 maintains package tracking database 660. Once a package record database entry is created, information is extracted out of the entry and copied to a companion record in the package tracking database 660 for access by a user accessing alias server 33. The tracking record database 660 is comprised of information on in-transit packages 25 and is available online through a series of interconnected WEB pages. Once a user accesses the home page of package processing system 10 home page, he/she will be able to access all of the package tracking information associated with the home page. Individual pages are generally sent in the form of Hyper-Text Markup Language (HTML) pages across a communication link to a WEB browser 560 operating on a requesting user terminal 28.

Figure 14:
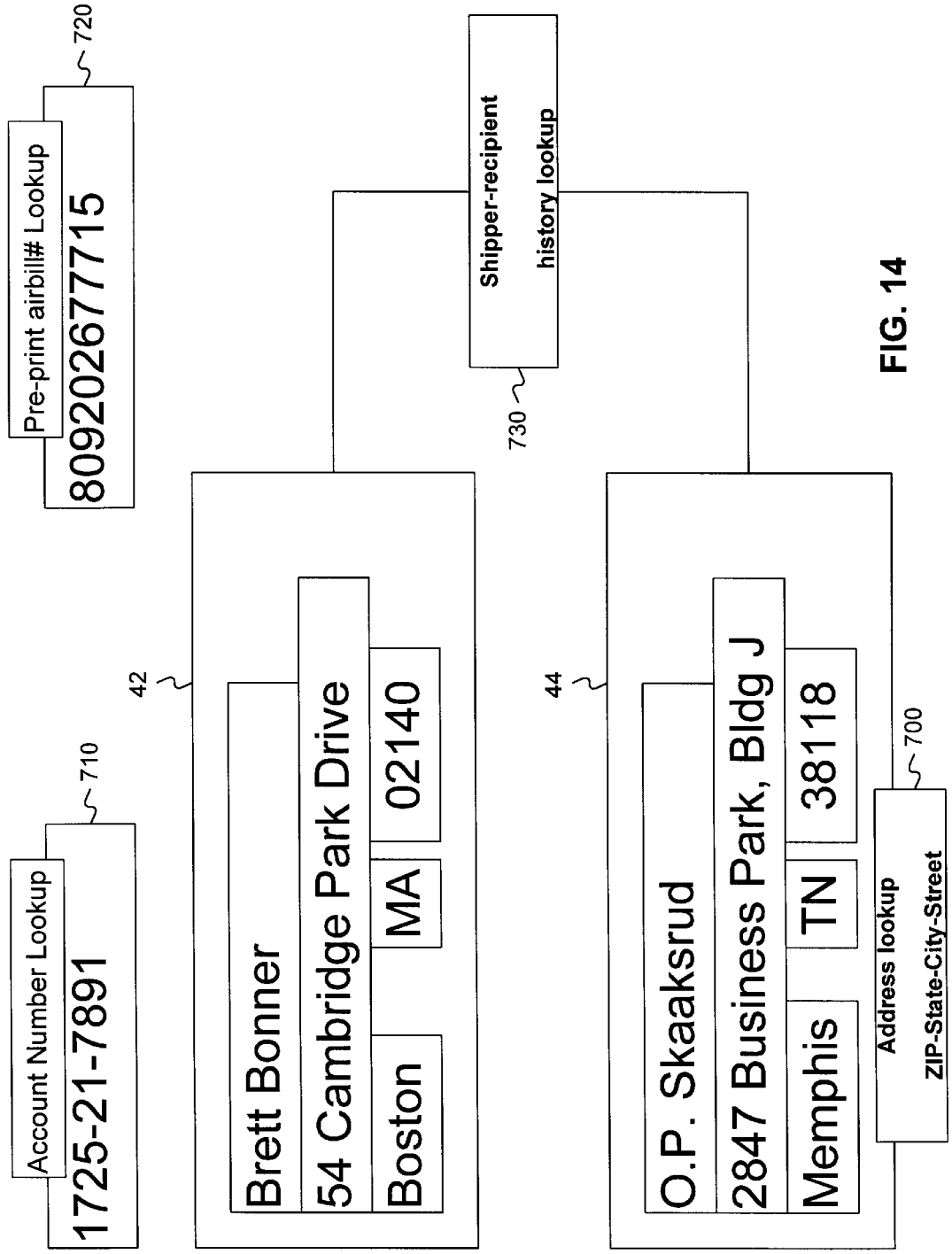
FIG. 14 is a sample source and destination label.

FIG. 14 shows a sample source and destination label for illustration of the use of lexicons in accordance with a preferred embodiment. In this simplified field-processing example, there are three lexicons. The lexicons are based on: street level address 700, account-specific information 710, pre-print airbill number 720, shipper information 42 (as shown in FIG. 3), recipient information 44 (shown in FIG. 3), and shipper-recipient history 730. As previously stated, when field processing system 66 receives the form 40 image and decoded machine readable code 46a from the form recognition system 64, it accesses lexicon database 36 to determine whether pre-print airbill number 720 is associated with a shipper of moderate re-ship frequency. If it is, field processing system 66 determines whether a single, or small number of source addresses 42 are associated with the pre-printed airbill number 720. If a relatively small number of addresses is associated with the airbill number 720, field processing system 66 extracts the address from the pre-printed airbills database 72. Otherwise it decodes the address using the appropriate recognition engine (O/ICR). Once the source address 42 is decoded, field processing system again accesses lexicon database 36 to ascertain whether there is a high priority shipper-recipient history 730. In effect, the field processing system 66 determines whether the shipper identified in the source address usually ships to the same address. If it does, the recognition engines work with the lexicon database to decode the destination address 44. Once the information is decoded, the system updates the priorities in the lexicon database 36 to reflect the previously processed form. In this way, the lexicons associated with lexicon database 36 reflect the shipper's latest trends in package processing. By tracking a shipper's behavior it becomes possible to select the optimal I/OCR-to-lexicon combination by individual shipper. A lower priority will be placed on the shipper-recipient lexicon if a shipper mostly sends to a large number of different recipients. This is how the adaptive reasoning affects the order in which the different lexicons will be applied to a specific field or record set. When applicable, the information is processed by using relationships between fields, or intra-field relationships (if such exist as part of form enrollment selection), and existing verified data. As previously mentioned, such relationships are identified at the time of form enrollment and are part of the lexicon selection process.

There may also be cases where third-party verification of record information is needed before the package is delivered. This would apply to billing-related fields such as account numbers and/or credit card information. That is once a package is processed by the pattern recognition system 62 and the machine readable code 46a is decoded, the package processing system 10 can attempt to secure authorization/verification of the billing method as a precondition to issuing a routing label. Furthermore, there may be cases where the building of the record requires additional information, not already on the form. This would apply to any record whose content needs to be verified to ensure supplied information meets the requirements of the application objective. An example would be verification that a package containing dangerous goods is properly safeguarded and packaged.

As shown in FIG. 1, the package 25 continues traveling along conveyor 27, it next encounters labeling station 18 where an operator scans the machine readable symbol 46a to recall package record database 37 associated with the imaged form. In most cases this will entail reading a bar code on the object. When the bar code is read, a lookup is performed against the package record database 37 of decoded entries. A routing label is then produced if the entry is located and all required information is available. If the entry is located, but there is insufficient information to generate a routing label, an exception label is generated. After being labeled with an exception label, the object is forwarded to an exception handling station 16. Once the anomaly is corrected, the package record database 37 entry is updated, and a new routing label is created and printed using an appropriate printer such as a bar code printer (not shown). The routing label is applied to the package and then utilized by human operators located at package loading station 20 to properly route the forms with their corresponding packages to the proper location, and track its progress.

Throughout the process, from the placement of the packages on the conveyor 30 to arrival of package 25 at labeling station 18, package processing system 10 repeatedly monitors the progress of the packages and utilizes exception handling station 16 to correct anomalies, as they arise. Exception handling station 16 is actually a combination of three other key components (secondary image capture, primary keying 14a, and labeling station 18). For these purposes, exceptions include situations where the form (airbill) image is not conclusively found, an un-enrolled form is identified, the OCR or ICR software fails to decode a character field with high confidence, or data decoded with high confidence is inconsistent (for example, an address that doesn't exist). Whenever an exception is identified, a human operator is notified to provide manual processing, an exception record is created, or both.

From the foregoing description, it will be appreciated that the present invention provides an efficient system and method for reading package information. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIGS. 10 and 11. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method of capturing and processing information from a plurality of forms concurrently the method comprising the steps of:

capturing an image of a plurality of forms randomly positioned on a moving conveyor belt and visible to an imager, each one of said forms being respectively associated with one of a plurality of packages;

locating at least one of said plurality of forms in said captured image, said at least one form comprising a plurality of information data fields; and decoding at least one of said plurality of information data fields.

2. The method of claim 1 including the step of repeating the locating and decoding steps until every form in said captured image has been processed.

3. The method of claim 1 wherein said image is comprised of a plurality of non-singulated forms.

4. The method of claim 3 wherein said captured image is comprised of a plurality of unjustified forms.

5. The method of claim 1 wherein said locating step is further comprised of the steps of:

locating a predetermined pattern in said captured image;

locating at least one fiduciary mark in said captured image, said at least one fiduciary mark does not exceed a predetermined distance from said predetermined pattern; and determining a region of interest, said region of interest circumscribes an area including said predetermined pattern and said at least one fiduciary mark.

6. The method of claim 5, wherein said predetermined pattern is a machine readable code.

7. The method of claim 5, wherein said predetermined pattern is numeric, alphanumeric, or alphabetic text.

8. The method of claim 5, wherein said predetermined pattern is a picture.

9. The method of claim 5 wherein said step of locating a predetermined pattern is further comprised of the steps of:

determining that a portion of said predetermined pattern is missing from said captured image; and combining said captured image with at least one prestored image to create a complete determined pattern.

10. The method of claim 5 wherein said determining step is further comprised of the steps of:

determining that a portion of the region of interest is missing from said captured image; and combining said captured image with at leas tone prestored image to create a complete region of interest.

11. The method of claim 1 wherein said decoding step is comprised of the steps of:

measuring a spatial relationship between at least one fiduciary mark and a predetermined pattern, said spatial relationship identifying a location and format of at least one of said plurality of information data fields located on said form; and decoding at least one of said plurality of information data fields.

12. The method of claim 11 wherein the decoding step is comprised of the following steps:

identifying an originating source associated with said form;

extracting information from at least one of said information data fields;

decoding said extracted information using a recognition engine, wherein said recognition engine is determined by the location and format of said information data field;

comparing said decoded information with a database entry of package information associated with said originating source; and replacing said decoded information with said package information, provided a predetermined criteria is met.

13. The system of claim 12 further comprising of the step of re-ordering said package information database, provided a predetermined criteria is met.

14. A computer system for capturing and processing information from a plurality of forms traveling on a conveyor belt, concurrently, comprising:

a memory having program instructions; and a processor configured to use the program instructions to capture an image of said plurality of forms, each one of said forms being associated with one of a plurality of packages respectively, to locate at least one of said plurality of forms in said captured image, wherein said at least one form comprises a plurality of information data fields, and to decode the information on said at least one of said plurality of forms.

15. The computer system according to claim 14, wherein the processor is further configured to repeat the locating and decoding instructions until every form in said captured image has been processed.

16. The computer system according to claim 14 wherein the locating instruction is further comprised of the following instructions:

locate a predetermined pattern in said captured image;

locate at least one fiduciary mark in said captured image, wherein said at least one fiduciary mark does not exceed a predetermined distance from said predetermined pattern; and determine a region of interest, wherein said region of interest circumscribes an area including said predetermined pattern and said at least one fiduciary mark.

17. The computer system according to claim 16, wherein the determining instruction is further comprised of the following instructions:

determine that a portion of the region of interest is missing from said captured image; and combine the captured image with at least one prestored image to create a complete region of interest.

18. The computer system according to claim 14, wherein the locating and predetermined pattern instruction is further comprised of the following instructions:

determine that a portion of said predetermined pattern is missing from said captured image; and combine the captured image with at least one prestored image to create a complete predetermined pattern.

19. The computer system according to claim 14, wherein the decoding instruction is further comprised of the following instructions:

measure a spatial relationship between at least one fiduciary mark and a predetermined pattern, said spatial relationship identifying a location and format of at leas tone of said plurality of information data fields located on said form; and decode at least one of said plurality of information data fields.

20. The computer system according to claim 19, wherein the decoding instruction is further comprised of the following instructions:

identifying a originating source associated with said form;

extract information from at least one of said information data fields;

decode said extracted information using a recognition engine, wherein said recognition engine is determined by the location and format of said information data field;

compare said decoded information with a database entry of package information associated with said originating source; and replace said decoded information with said package information, provided a predetermined criteria is met.

21. The system of claim 20 further comprising of the instruction to reorder said data entry of package information, provided a predetermined criteria is met.

22. A system for capturing and processing information from a plurality of forms concurrently, said forms being randomly positioned on a moving conveyor belt and visible, said system comprising:

means for capturing an image of said plurality of forms, each one of said forms being respectively associated with each of a plurality of packages;

means for locating at least one of said plurality of forms in said captured image, wherein said at least one form is comprised of a plurality of information data fields; and means for decoding the information on said at least one of said plurality of forms.

23. The system of claim 22 including means for executing the means for locating and the means for decoding until every form in said captured image has been processed.

24. The system of claim 22, wherein the means for locating is further comprised of:

means for locating a predetermined pattern in said captured image;

means for locating at least one fiduciary mark in said captured image, said at least one fiduciary mark does not exceed a predetermined distance from said predetermined pattern; and means for determining a region of interest, said region of interest circumscribes an area including said predetermined pattern and said at least one fiduciary mark.

25. The system of claim 24, wherein the means for locating is further comprised of:

means for determining that a portion of said predetermined pattern is missing from said captured image; and means for combining said captured image with at least one prestored image to create a complete predetermined pattern.

26. The system of claim 24, wherein the means for determining is further comprised of:

means for determining that a portion of the region of interest is missing from said captured image; and means for combining said captured image with at least one prestored image to create a complete region of interest.

27. The system of claim 22 wherein the means for decoding is further comprised of:

means for measuring a spatial relationship between at least one fiduciary mark and a predetermined pattern, said spatial relationship identifying a location and format of at least one of said plurality of information data fields located on said form; and means for decoding at least one of said plurality of information data fields.

28. The system of claim 27 wherein the means for decoding is further comprised of:

means for identifying an originating source associated with said form;

means for extracting information from at least one of said information data fields;

means for decoding said extracted information using a recognition engine, wherein said recognition engine is determined by the location and format of said information data field;

means for comparing said decoded information with a database entry of package information associated with said originating source; and means for replacing said decoded information with said package information, provided a predetermined criteria is met.

29. The system of claim 28 further comprising of means for re-ordering said package information database, provided a predetermined criteria is met.

30. A method of capturing and processing information from a plurality of forms concurrently, said forms being visible to an imager and associated with a plurality of packages that are randomly positioned on a moving conveyor belt, the method comprising:

capturing an image of said plurality of packages and the associated forms;

locating at least one of said plurality of forms in said captured image, said at least one form comprised of a plurality of information data fields; and decoding at least one of said plurality of information data fields.

31. The method of claim 30 further including:

repeating the locating and decoding steps until every form in said captured image has been processed.

32. A method of capturing and processing information from a plurality of forms associated with packages concurrently, the method comprising:

capturing an image of a plurality of packages that are randomly positioned on a moving conveyor belt;

locating in said captured image at least one form corresponding to one of the plurality of packages, the at least one form comprised of a plurality of information data fields; and decoding at least one of said plurality of information data fields.

* * * * *

UNITED STATES PATENT AND TRADEMARK OFFICE
CERTIFICATE OF CORRECTION

PATENT NO. : 6,778,683 B1
DATED : August 17, 2004
INVENTOR(S) : Brett Bracewell Bonner et al.

It is certified that error appears in the above-identified patent and that said Letters Patent is hereby corrected as shown below:

Title page,
Item [75], Inventor, "O. Skaaksrud" should read -- Memphis, TN -- instead of "Cordova, TN".

Column 16,
Line 26, "leas tone" should read -- least one --.

Column 17,
Lines 37-38, "leas tone" should read -- least one --.

Signed and Sealed this

Twenty-sixth Day of October, 2004

JON W. DUDAS
*Director of the United States Patent and Trademark Office*